United States Patent [19]

Yoshida et al.

[11] Patent Number: 4,773,196
[45] Date of Patent: Sep. 27, 1988

[54] FLOORING PANELS FOR FREE CABLE LAYING

[75] Inventors: Minoru Yoshida; Hiroshi Yoshida; Toshiro Ishikawa, all of Yamato; Minoru Kanesaka, Tokyo; Nobuyuki Ishii, Mitaka, all of Japan

[73] Assignee: Kyodo Electric Co., Ltd., Tokyo, Japan

[21] Appl. No.: 13,040

[22] Filed: Feb. 10, 1987

[30] Foreign Application Priority Data

May 30, 1986 [JP] Japan .................................. 61-124973

[51] Int. Cl.⁴ ............................ E04B 5/58; E04B 5/48
[52] U.S. Cl. .................................... 52/221; 52/126.5; 52/220; 52/263; 174/48
[58] Field of Search ................ 52/126.4, 126.1, 126.2, 52/126.6, 220, 221, 98–100, 263, 126.5; 174/48, 49; 404/2–5

[56] References Cited

U.S. PATENT DOCUMENTS

| | | |
|---|---|---|
| 3,815,304 | 6/1974 | Schille et al. ...................... 52/221 X |
| 3,894,370 | 7/1975 | Parazader .......................... 52/220 X |
| 4,016,357 | 4/1977 | Abrahamsen . |
| 4,035,967 | 7/1977 | Harvey . |
| 4,074,488 | 2/1978 | Ray, III . |
| 4,085,557 | 4/1978 | Tharp . |
| 4,124,324 | 11/1978 | Augis et al. ....................... 52/220 X |
| 4,593,499 | 6/1986 | Kobayashi et al. ................ 52/126.6 |
| 4,596,095 | 6/1986 | Chalfant ............................. 52/126.6 |

FOREIGN PATENT DOCUMENTS

| | | | |
|---|---|---|---|
| 2353865 | 5/1975 | Fed. Rep. of Germany ........ 174/48 |
| 1174562 | 12/1969 | United Kingdom .................. 174/48 |

Primary Examiner—David A. Scherbel
Assistant Examiner—Richard E. Chilcot, Jr.
Attorney, Agent, or Firm—Birch, Stewart, Kolasch, & Birch

[57] ABSTRACT

In a flooring panel, plural blocks are held by a holding member of a flexible material so that one section is formed by at least one block with a space for laying a cable defined between adjacent sections. A cover member overlying these spaces is arranged to present a surface continuous with the upper surface of the blocks to form a flat, top surface of the flooring panel. The flooring panel is in the form of a rectangular modular flooring panel of at least one shape and size. A plurality of cable laying spaces in communication with one another are defined by laying a plurality of such modular flooring panels on a building floor as a function of the amount of cables to be laid. In such a manner, the operation of cable laying and construction of the flooring panels on the permanent building floor may be performed more efficiently while the interaction between the cables of different kinds is minimized.

21 Claims, 8 Drawing Sheets

FLOORING PANELS FOR FREE CABLE LAYING

BACKGROUND OF THE INVENTION

1. Field of the Invention

The present invention relates to a flooring structure, and more particularly to a flooring panel for use in a site for electrical devices such as computers or office automation devices for laying cables such as power feed cables, signal cables or communication cables for interconnecting the computers or devices.

2. Description of the Prior Art

An elevated floor structure has so far been known as the aforementioned flooring structure adapted for laying the cables above the permanent floor.

As an example, the Japanese Patent Laid-open Publication No. 112954/1985 discloses an elevated floor structure comprised of a plurality of flooring panels supported over a permanent floor by plural spacers such as blocks or pedestals securely placed on the permanent floor. The cables of various types such as the power feed lines, signal lines and the communication lines are laid in the space between the permanent floor and the flooring panels so as to be pulled at desired locations to the space above the flooring panels for electrical connection with the devices or computers.

In such previously proposed floor constructions, the cables tend to be laid in disorder in the space below the flooring panels. In such case, when the signal or communication lines or cables are in close proximity to a power feed line or cable, noises or similar hindrances may be occasionally produced in the signal or communication lines due to voltages induced from the power feed line. Above all, the signal or communication lines contacting with the feed line may cause a serious danger to the equipment or human attendants. In addition, such disorderly or hybrid cable laying is not desirable since, when the cable laying is to be changed or a cable or cables are to be annexed at the time of reallocation or extension of the electrical devices, it is rendered difficult to determine to which device a given cable is actually connected.

Moreover, in the aforementioned previously proposed flooring structure, a great deal of skill and labor is required in adjusting the height of the spacer members installed on the permanent floor in order to provide a flat surface of the floor panels. In addition, the horizontal surface thus obtained tends to be deviated from the true level with prolonged usage so that it becomes necessary to perform an operation of re-adjusting the level which again requires considerable skill and labor.

SUMMARY OF THE INVENTION

It is therefore an object of the present invention to provide a floor panel according to which the construction on the permanent flooring and the cable laying operation may be performed efficiently and the interaction between different types of cables may be minimized.

The flooring panel according to the present invention is comprised of a holding member of a flexible material, a plurality of blocks held by said holding member so that one section is formed by at least one block, with a space for laying a cable defined between the sections, and a cover member overlying said spaces and presenting a surface that is continuous with the upper surface of the blocks to form a substantially flat, top surface of the flooring panel.

According to the present invention, the flooring panel may be in the form of a plurality of rectangular modular flooring panels having at least one shape and size, and a plurality of at least one type of such modular floor panels are installed on a floor of a building for forming a continuous cable laying space.

According to one aspect of the present invention, there are formed a plurality of types of the modular flooring panels with different types of cable laying spaces, these modular flooring panels being selectively installed under a cable laying condition such as the volume of cables to be laid.

According to a further aspect of the present invention, an additional space may be formed by selective removal of the blocks secured to a flat plate. This additional space may be in communication with the cable laying spaces and used for accommodating cable laying devices or electrical devices. The additional space thus accommodating the electrical devices may be covered with a cover member.

According to a still further aspect of the present invention, a spacer may be provided at the intersection of the cable laying spaces for separating the intersecting cables from each other.

According to another aspect of the present invention, each block has holding means for holding a partitioning flat plate member at at least one intermediate position along the height of the blocks, whereby the cable laying space is divided into plural subspaces or layers.

The present invention provides a flooring panel to be laid on a floor of a building for placing a cable therein, comprising: a plurality of blocks of solid material; holding means including a flexible material for holding said blocks so that said blocks define a plurality of sections, each of said sections containing at least one block with a cable laying space defined between adjacent ones of the sections; and a covering member supported by at least a portion of said blocks for covering at least an upper opening of the cable laying space, said covering member presenting a surface that is continuous with upper surfaces of said blocks to form a substantially flat, top surface of said flooring panel.

Further scope of applicability of the present invention will become apparent form the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only, and thus are not limitative of the present invention, and in which.

DESCRIPTION OF THE PREFERRED EMBODIMENTS

Figure 1:
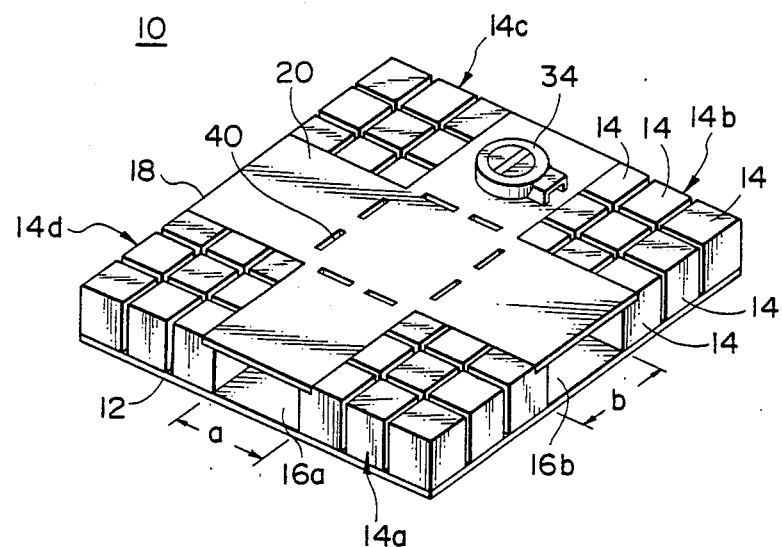
FIG. 1 is a perspective view showing an embodiment of the flooring panel according to the present invention.
Figure 2:
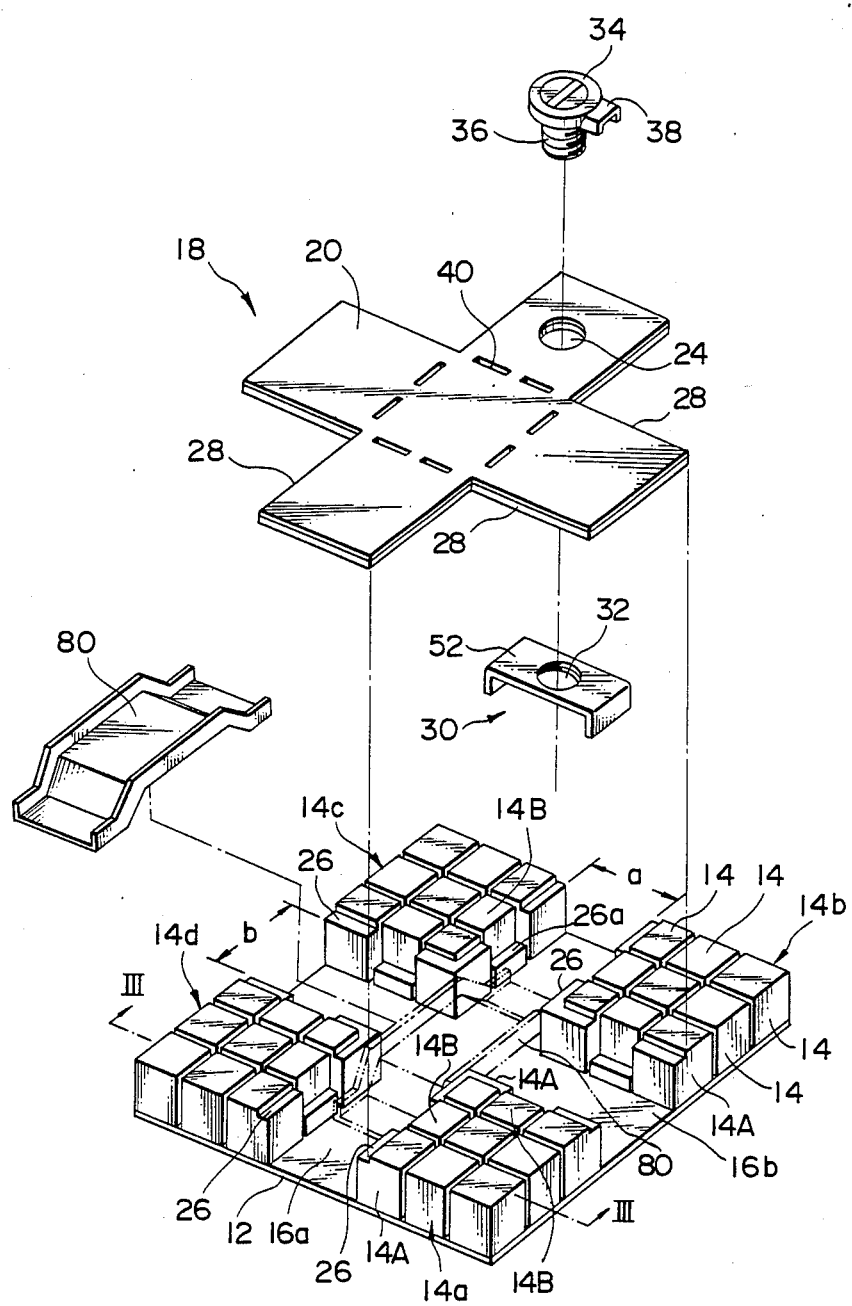
FIG. 2 is an exploded perspective view of the flooring panel shown in FIG. 1.
Figure 3:
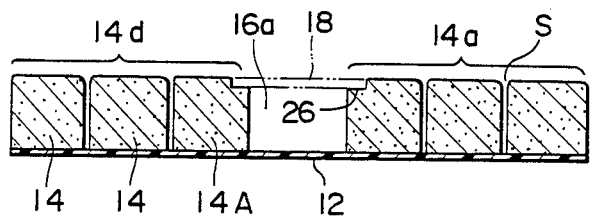
FIG. 3 is a sectional view taken along a chain line III—III in FIG. 2.

Referring to FIGS. 1, 2 and 3, a flooring panel 10 according to a specific embodiment of the present invention basically includes a substantially square or rectangular flat sheet 12 of a reduced thickness, a plurality of blocks each being of a substantially cubic form and secured to one of the main surfaces of the sheet 12, and a cover plate 18 for covering cable laying ducts 16a and 16b formed intermediate groups of these blocks 14.

Figure 11:
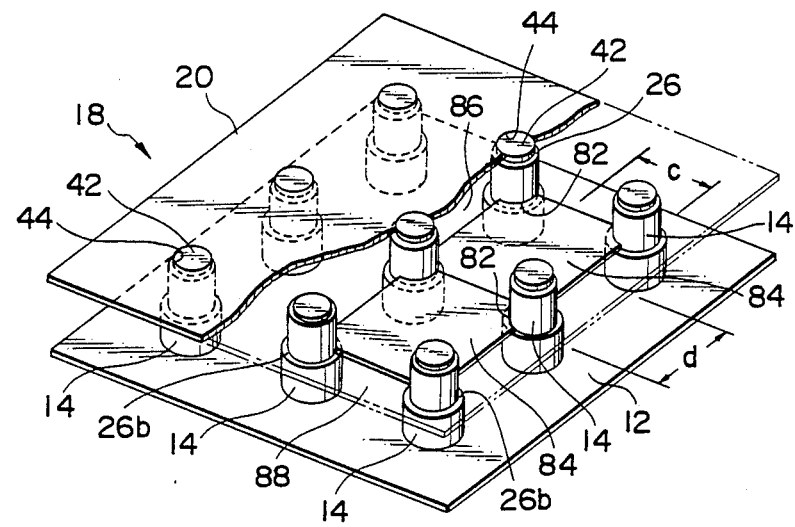
FIG. 11 is a partially cut-away, perspective view showing an alternative embodiment of the flooring panel of the present invention, with one portion being cut away.
Figure 13:
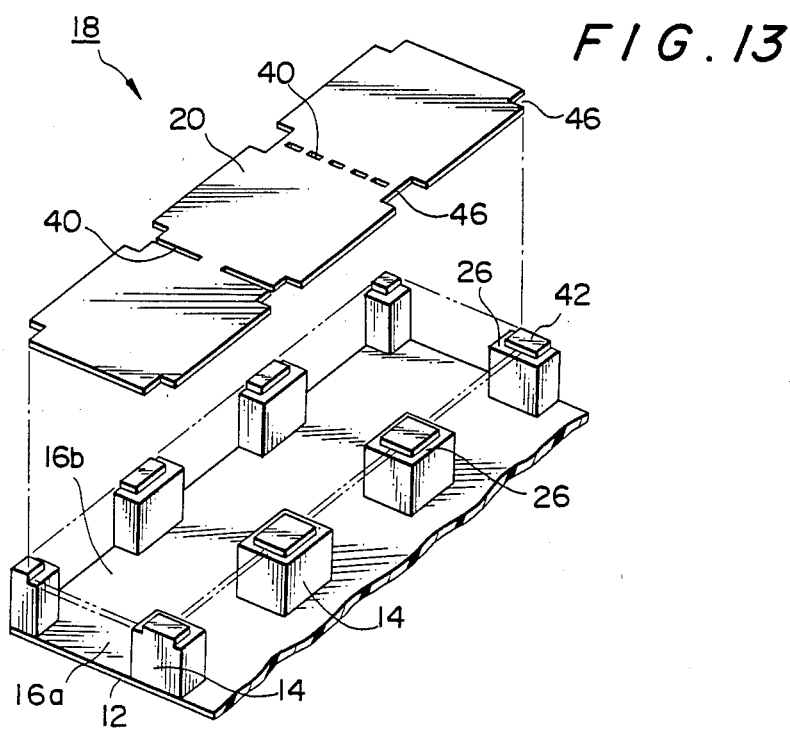
FIG. 13 is an exploded perspective view showing a portion of the flooring panel according to a further alternative embodiment of the present invention.
Figure 14:
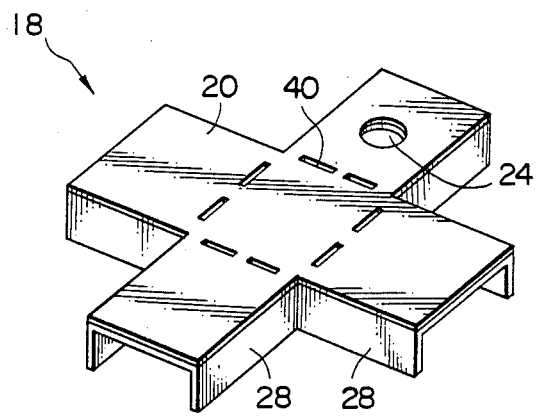

According to the present embodiment, each block 14 is generally of a parallelepipedic form, and preferably made of a solid material, such as hard synthetic material or light-weight concrete prepared by admixing sawdust, foam or perlite into mortar or cement. The blocks may also be in the form of a column as shown in FIG. 11 or in the form of a square pillar or prism as shown in FIG. 13.

The sheet 12 may for example be in the form of a rectangle of 40 cm–60 cm with a reduced thickness and made of any suitable flexible material such as ordinary or hard synthetic resin, rubber, steel or aluminium. The sheet 12 is used as a substrate on which the plural blocks are securely supported so that it is required to be flexible enough to conform to the natural irregularities of a building floor surface. According to the present embodiment, a plurality of such sheets 12 of the same shape are formed as modules or units, and laid on the floor side by side to cover the permanent building floor having any arbitrary surface measure. It is noted that the sheet may be formed as an elongated sheet strip of a prescribed width or as a flooring having the same shape as the building floor. The panel 10 may be permanently secured to the building floor by an adhesive or a double-sided adhesive tape applied to the lower sides of the blocks 14 and/or the sheets 12. The panel 10 may also be removably secured to the building floor by using transient fasteners such as pressure-sensitive adhesives or surface fasteners.

In the present embodiment, the blocks 14 are arranged in four groups or sections 14a, 14b, 14c and 14d at the four corners of the square sheet 12, as shown, with each group 14a to 14d consisting of plural blocks 14. In the present embodiment, nine blocks 14 are arranged in a square pattern in each of these sections. If a section is of a reduced area or surface measure, it may consist only of a single block having the same shape as the section, without consisting of a plurality of blocks.

These groups are separated from one the other by the cable laying ducts 16a and 16b in a cruciform having prescribed widths a and b, respectively. Those blocks defining the cable laying ducts 16a and 16b, namely six 14A of the nine blocks 14 of one section confronting to the ducts 16A to 16C in the present embodiment, are each formed with a step or shoulder 26 on one side or both sides forming a corner. The steps 26 are designed to support an edge 28 of the cover plate 18. With the exception of a step 26a of the block 14B to be later described, the height of the steps from the upper surface of the sheet 12 is selected so that the upper surface of the cover plate 18, when placed on the steps 26, runs approximately parallel to or flush with the upper surface of the block 14.

Figure 4:
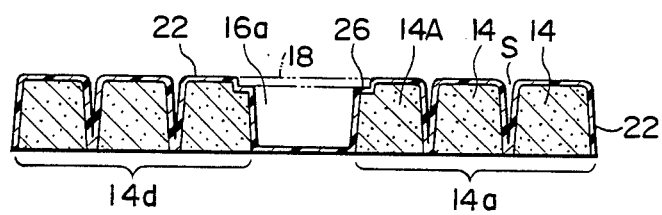
FIGS. 4 and 5 are sectional views, similar to FIG. 3, showing an alternative embodiment of the flooring panel of the present invention.
Figure 5:
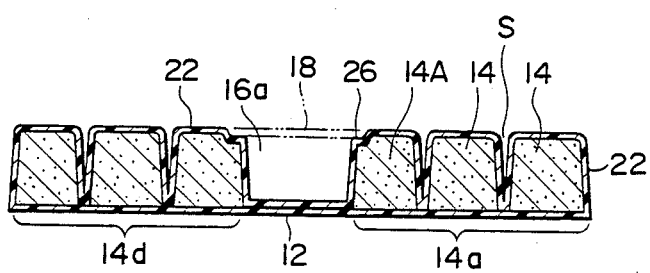

As may be seen from FIG. 3, the blocks 14 are arranged relative to one another so that a small gap or spacing S is defined between the adjacent blocks 14. The spacing S in side elevation may be approximately rectangular as shown in FIG. 3 or V-shaped as shown in FIGS. 4 and 5. In the latter case, the block 14 is in the form of a truncated pyramid. By the provision of the spacing S, the adjacent blocks 14 do not abut on each other even when the sheet 12 becomes flexed due to natural irregularities of the building floor so that the sheet may adapt itself freely to these irregularities.

The blocks 14 may for example be affixed to and held by the upper surface of the sheet 12 by an adhesive as seen in FIG. 3. These blocks 14 may also be covered with a layer 22 of the same material as the sheet 12. The covering layer 22 is molded with plural recesses having the same shape and pitch as the blocks 14 such that the blocks can be snugly received in these recesses and secured to the layer 22 with an adhesive. When the blocks 14 are formed of mortar, the blocks may be completed by casting the mortar into these recesses. Thus, in this case, the overall surfaces of the block 14 are covered with the sheet 12 and the layer 22.

Alternatively, as shown in FIG. 4, when the blocks 14 are combined and held together by the covering layer 22 cast integrally therewith, the sheet 12 may be omitted. In this case, the upper and lateral sides of the blocks 14 are covered with the sheet 12 and the covering layer 22 such that the blocks 14 are flexibly connected together by the covering layer 22.

The cable ducts 16a and 16b are covered with the covering plate 18 which has an overall size not in excess of that of the sheet 12 and a cruciform shape slightly larger than the cable ducts 16a and 16b. The covering plate 18 is formed of a suitable sturdy material, such as steel, aluminium or hard synthetic material, since it is disposed on the upper opening of the wiring channels 16a and 16b for securely supporting various large-size units placed on a raised floor, not shown.

Figure 12:
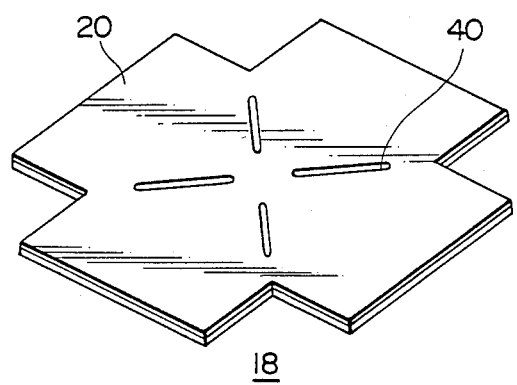
FIGS. 12 and 14 are perspective views showing a modification of a cover plate used in the flooring panel of the present invention.

The cover plate 18 may be of the size of the flooring panel 10, that is, of approximately the same size as the sheet 12. FIG. 11 illustrates such an embodiment. Also, in the embodiment shown in FIG. 8, the cover plate having the same shape and size as the flooring panel 10 may be advantageously placed on the panel. Alternatively, plural flooring panels 10 may be covered with a sole cover plate. Also, as shown in FIG. 13, the sole square flooring panel 10 may be covered with plural cover plates 18 each having a rectangular form and the size lesser than that of the square flooring panel. Or alternatively, only the cable ducts 16a and 16b included in the sole flooring panel 10 may be covered with a sole cover plate 18, as shown in FIGS. 1 and 12. In such case, the cover plate 18 may be in the shape of a cruciform, a parallel cross or a lattice so as to conform to the shape of the cable ducts 16a and 16b. Still alternatively, the upper opening part of the cable ducts of a sole flooring panel 10 may be covered with plural cover plates.

For example, in the case of the parallel cross shaped cable ducts, four cruciform cover plates may be advantageously employed for separately covering the upper opening part of the cable ducts. If the cable ducts are formed by three vertical channels and two horizontal channels arranged orthogonally to each other, six cruciform cover plates are advantageously employed. Similarly, when the channels are formed by three horizontal and vertical channels arranged in a lattice structure, nine cruciform cover plates are employed. The cover plates in the form of parallel crosses or the cover plates in the cruciform shape may also be combined to conform to the overall shape of the cable ducts. If the flooring panel has a rectangular overall shape and the cable ducts in the form of a lattice or the parallel crosses, two different types of the cruciform cover plates with different lengths of the cruciform arms may be employed in dependence upon the laying pitch or laying interval of the cable ducts.

The upper surface of the cover plate 18 may be coated with a layer of a shock-absorbing material 20. The layer 20 improves the conformability of the cover plate 18 to the flooring thereon, if any, and to the blocks 14 and also improves the feeling for walking. The layer 20 may be applied to the upper surface of the cover plate 18 by coating a synthetic resin film or depositing short fibers of synthetic resin by electro-static implanting.

When the layer 20 is applied to the cover plate 18 as the electro-statically implanted short fibers, a top layer 48 as seen in FIGS. 1 and 2, laid on the whole structure of flooring panel 10 inclusive of the cover plate 18 tends to be affixed well to the implanted fiber layer 20, resulting in frictional engagement with and hence the correct positioning on the layer 20 of the top layer 48. This in turn results in preventing the top layer 48 from shifting horizontally under the walking shock. When the top layer 48 is properly held in this manner, any fasteners used conventionally for securing the top layer 48 may be dispensed with so that the top layer 48 can be laid efficiently.

The flooring panel 10 is laid on the permanent building floor, and the cables 50 are then housed in the cable ducts 16a and 16b as required and covered with the cover plate 18, which is finally covered with the upper plate 48. The cables 50 may be branched at any intermediate point by a cable outlet 34, FIG. 2, while the connection between an outlet 60 and an electrical component may be achieved by a cable laying fixture 56, FIG. 9.

In the embodiment shown in FIGS. 1 and 2, the cover plate 18 is in a cruciform shape. The cover plate 18 may have for example a circular opening 24 in one of its arms for pulling out the cable 50, FIG. 8, via the cable ducts 16a or 16b. The cover plate 18 having the opening 24 may be placed on top of the cable ducts 16a and 16b, and the cables 50 placed in for example the cable ducts 16a may be led to the outside via the opening 24.

When mounting the cable outlet 34 such as the high or low tension outlet to the opening 24, a prop or pedestal 30 in the form of an inverted U may be placed below the opening 24. To this end, steps or shoulders 26a of both blocks 14B associated with the opening 24 are lower in height than the step 26, such that, when the pedestal 30 is placed on the step 26a and the cover plate 18 is placed on the pedestal 30, the cover plate 18 may have its upper surface 20 substantially flush with respect to the upper surface of the blocks 14.

The pedestal 30 has a central circular tapped opening 32 in which a male threaded neck 36 of the cable outlet 34 is engaged through the opening 24 in the cover plate 18. The cable outlet 34 is engaged via the cover plate 18 with the pedestal 30 and is also adapted to pull the cable outwards through a cable pull-out port 38. The pull-out port 38 may be oriented in the desired direction by turning the outlet 34 about the neck 36. Although the top layer 48 such as a carpet or a plastic tiling is laid on the cover plate 18, the neck 38 of the cable outlet 34 may be threadedly engaged with the tapped hole 32 of the pedestal 30 through the opening 24 in the cover plate 18 and an opening in the top layer 48 for securing the cable outlet 34 to the flooring panel 10.

The upper surface 52 of the pedestal 30 may be covered with the same shock-absorbing material as the layer 20 of the cover plate 18 for absorbing the shock otherwise applied to the pedestal 30 from the cover plate 18.

The pedestal 30 with the tapped hole may be of desired shape other than the inverted U shape. For example, it may be a flat plate provided with the tapped hole 32 and supported by the step 26a of the block 14B so that the tapped hole is aligned with the opening 24 in the cover plate 18. Alternatively, the pedestal in the form of the flat plate may be adhered or welded to the underside of the cover plate 18 so that its tapped hole is aligned with the opening 24 of the cover plate 18.

Since a pair of the blocks 14B each having the step 26a of a lower height are provided so as to be in register with the cable pull-out openings 24 of the cable ducts 16a and 16b, the cover plate 18 having only one opening 24 may be used and rotated manually by steps of 90° in dependence upon a desired cable pull-out position, so that the cable can be pulled outwards through the desired one of these four positions. In such a manner, the position of the cable outlet 34 and the orientation of the cable pull-out port 38 can be finely changed as desired in order to deal with changes in the pulling out or branching position of the cables 50. It is noted that several cable pull-out openings 24 may be provided to the cover plate 18.

The cover plate 18 is designed to support the weight of the various devices or the body weight of human attendants. On the other hand, the sheet 12 may preferably be deformed easily to conform to the irregularities on the surface of the blocks 14 that are caused by the occasional irregularities of the building flooring to which the floor panel 10 is applied. To this end, the cover plate 18 of the present embodiment is formed with slits 40 at the neck of its cruciform arms such that the cover plate 18 may be deformed easily at the slits 40 to conform to surface irregularities of the blocks caused by the flexure of the sheet 12 due to the irregularities of the permanent building floor. By virtue of these slits 40, the cover plate 18 may be flexible enough to conform to the irregularities of the building floor without reducing the load bearing properties even when the cover plate is of a reduced thickness. The slits 40 may have the shape, number and disposition such as are shown in FIGS. 12 and 13 and, hence those shown in FIG. 1 are not limiting the present invention. In other words, the width, length, shape and number as well as the position of the slits 40 may be determined as a function of the shape and the plate thickness of the cover plate 18. These slits may also be used for visual inspection of the types and the current status of the cable 50 accommodated within the cable ducts 16a and 16b without removing the cover plate 18.

Figure 8:
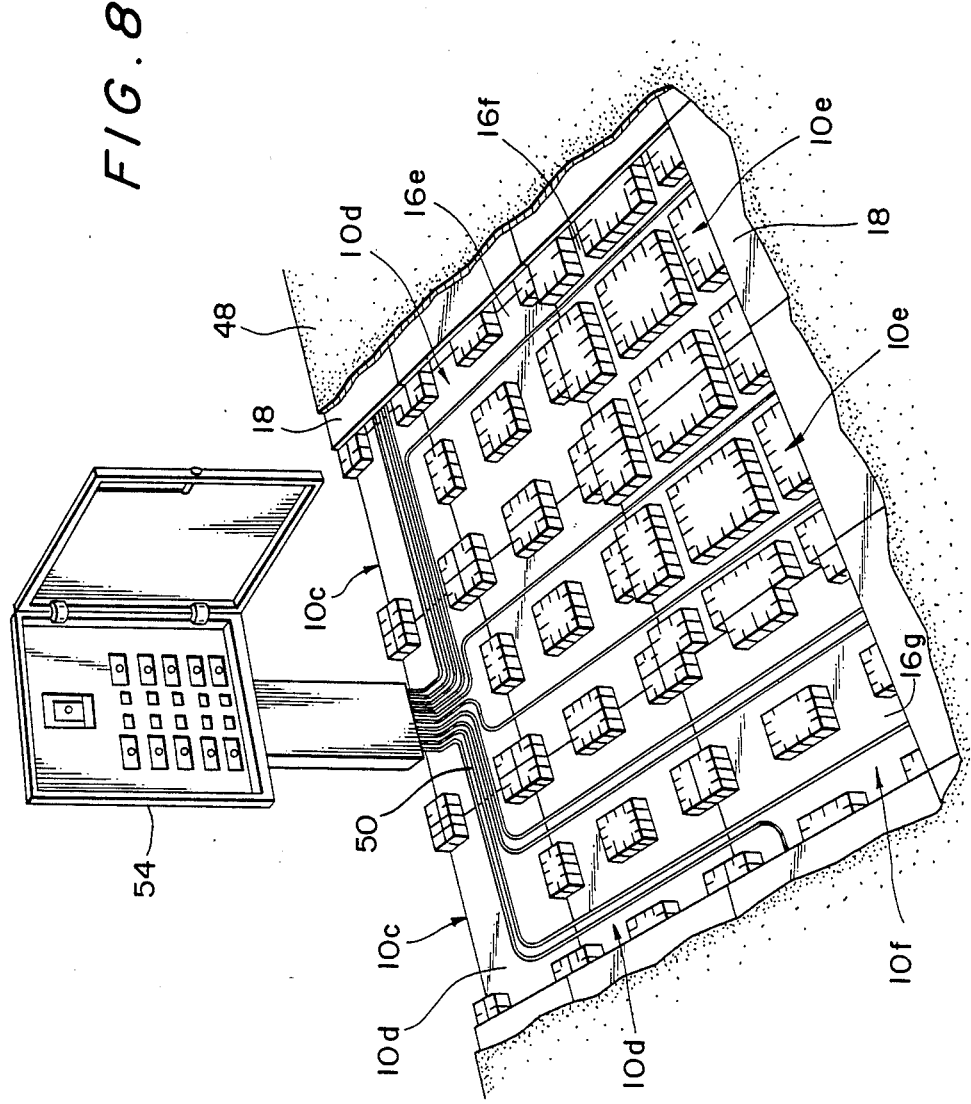
FIG. 8 is a partially cut-away, perspective view schematically showing an example of the flooring panels of the present invention as applied to the construction site, with a portion being cut away.

When the floor panel 10 as a whole is covered with a sole cover plate or by plural split-type cover plates, the cover plate or plates can be secured in position by simply placing the cover plate or plates. FIG. 8 shows such an example.

Alternatively, in the case of a floor panel 10 shown in FIG. 11 wherein a large number of blocks 14 in the form of columns for example are arranged in an orderly array on the sheet 12, the cover plate 18 having the same large number of the circular openings 44 in register with upper portions 42 of the columns 14 is employed. In such a case, the cover plate 18 is supported with the circular openings thereof engaged by the upper portions 42 of the columns 14, the cover plate 18 then resting on the steps 26 formed on the periphery of the columns 14. The height of each step 26 from the upper surface of the sheet 12 is selected such that the cover plate 18, when resting on the steps 26, has its upper surface 20 substantially flush with the upper surface of the upper portions 42 of the blocks 14.

In the case of the floor panel 10 as shown in FIG. 13 wherein a large number of prismatic blocks 14, for example, are arranged on the sheet 12, a cover plate 18 is used which has a number of recesses 46 in register with the upper portions 42 of the prisms 14 or square pillars. In this case, the cover plate 18 is supported with the recesses 46 engaging with the upper terminal portions 42 of the prisms 14, the cover plate 18 then resting on the steps 26 formed about the periphery of these prisms 14. The height of the step 26 from the upper surface of the sheet 12 is so selected that the cover plate 18, when resting on the steps 26, has its upper surface 20 substantially flush with the upper surface of the terminal portions 42 of the blocks.

The unitary or split type cover plate 18 covering only the upper opened part of the cable ducts may be retained and supported by the steps 26 formed on the sides of the blocks 14A confronting to the cable ducts 16a and 16b, as shown for example in FIG. 2.

Figure 6:
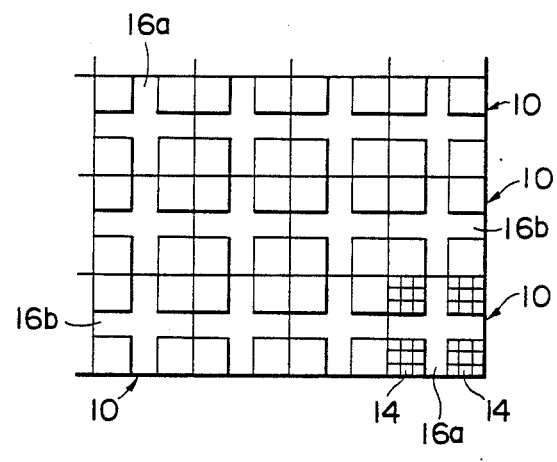
FIGS. 6 and 7 are schematic plan views showing an example of the flooring panels of the present invention as applied to the construction site.

The cover plate 18 need not be in the form of a flat plate as described above, but may have its peripheral portions 28 bent downwards so as to have a channel shape or the shape of an inverted U when seen in a vertical section. In such a case, the cover plate 18 is supported with both legs 28 of the inverted U resting on the surface of the sheet 12 at the bottom of the cable ducts 16a and 16b such that the upper surface 20 of the cover plate 18 is flush with the upper surface of the blocks 14. Hence the steps 26 for the blocks 14A confronting to the cable ducts 16a and 16b may be omitted. Referring to FIG. 6, there is shown an embodiment wherein a number of flooring panels 10 each having the cruciform cable ducts 16a and 16b are laid on the building floor. In the present embodiment, the floor panels 10 are of the same type such that cable conduits of a lattice shape as a whole are defined by the cruciform cable ducts 16a and 16b of the respective flooring panels. The cables 50 may be placed in the cable ducts such that the same type of the cables are housed in the same cable ducts. In such a manner, hybrid cable laying of different types of cables may be avoided, thus resulting in improved operability. Those portions of the sheet 12 corresponding to the bottom surfaces of the cable ducts 16a and 16b that are to be used in accordance with the scheduled routing of the cable interconnections may be afforded with indications in a color tape or paint designating the types and the routing of the cables 50. In such a manner, the cable routing can be checked visually so that the efficiency in the cable laying and the subsequent maintenance operations may be improved.

Referring again to FIG. 2, a bridge shaped spacer 80 may be provided at a crossing point of the cruciform cable ducts 16a and 16b. The spacer 80 may have the size to conform with the area of the crossing point of the ducts 16a and 16b, and may be so designed that the cables housed within one duct, such as the duct 16a and those housed within the other duct 16b, are passed above and below the spacer 80, respectively. This results in separation of two cables of different types, usage or application, such as the power cable and the communication cable, from each other for avoiding their crossing contact so that the power line may be inhibited from interfering with the communication cable.

The spacer 80 may be formed for example of hard synthetic resin or metal such as steel or aluminium. If need be, the spacer 80 may be coated with a layer of an electrical insulating or a shock-absorbing material. This results in improving the electrical safety and minimizing noise induction due to the personnel walking on the flooring panel 10.

Figure 7:
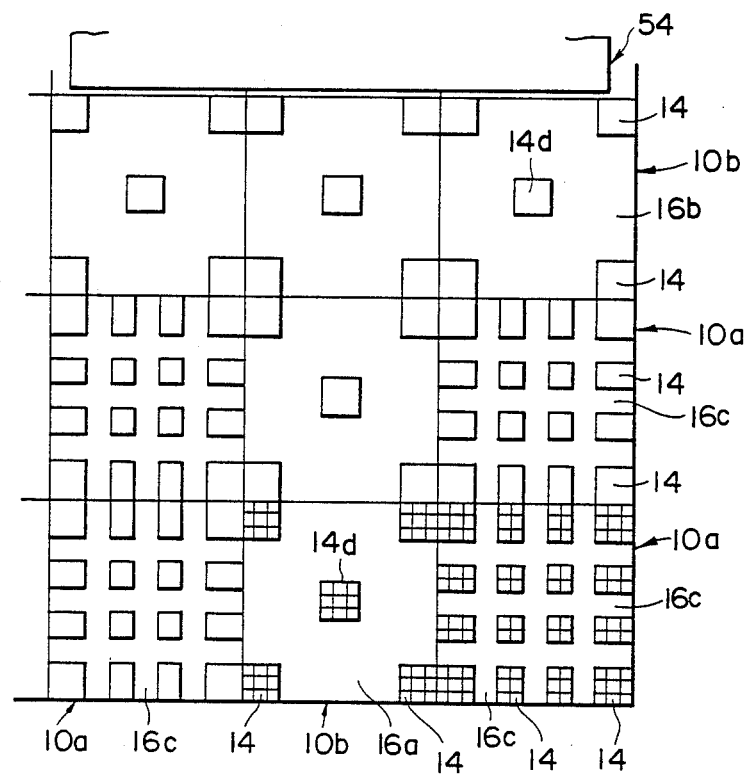

FIG. 7 shows an embodiment wherein a flooring panel 10a having lattice-shaped cable ducts 16c with relatively narrow duct widths and another flooring panel 10b having similarly lattice-shaped ducts 16a and 16b of larger duct widths defining only one block 14d at the center and four corner blocks 14. These floor panels 10a and 10b are laid on the permanent flooring of the building with the cable ducts 16a, 16b and 16c in communication with one another. The flooring panel 10b with the larger duct width is placed in a zone with a higher cable volume per unit area, as in the vicinity of an electrical arrangement 54, such as a power distribution board, where the trunk line of the cables 50 or the large number of cables 50 are concentrated or branched, while the flooring panel 10a with a lesser duct width is placed in the other zones where the cable volume per unit area is lower. In such a case, although discontinuities may be caused in the number, the pitch and width of the cable ducts 16a to 16c as a function of the disposition of the flooring panels 10a and 10b, proper flooring panels can be selected as the occasion may require in order to provide the continuous cable ducts. In such a manner, plural types of the flooring panels can be made available and selectively positioned as a function of the cable volume in order to deal with the actual cable laying conditions.

FIG. 8 shows the disposition of the flooring panels in the vicinity of the electrical equipment 54 where the cable concentration is higher, as in the vicinity of the distribution board. Since the volume of the cables 50 per unit area, or cable concentration density, is high in the vicinity of the electrical equipment 54, rectangular floor panels 10c having a larger duct width and cruciform cable duct 16d are placed in the vicinity of the equipment 54. Since the area surrounding the equipment 54 is lower in the cable density, there are placed flooring panels 10d having the cable duct 16e in the form of parallel cross and a narrower duct width. The flooring panel 10d has a square shape different from the rectangular shape of the flooring panel 10c. The square flooring panels 10e having the narrow duct width and the cable ducts 16f in the form of parallel crosses are laid in the area surrounding the floor panels 10d where the cable density is still lower. In the present embodiment, however, square floor panels 10f having broader cable ducts 16g are placed in areas where the cable density is higher despite an increased distance thereof from the electrical equipment 54. By laying the flooring panels 10c, 10d, 10e and 10f having different duct widths as a function of the cable laying conditions such as the cable volume or density, the cable laying or interconnections can be made without any inconvenience despite cable concentration or branching. The flooring panels 10 can also be applicable to any situations pursuant to the volume of cables.

Figure 9:
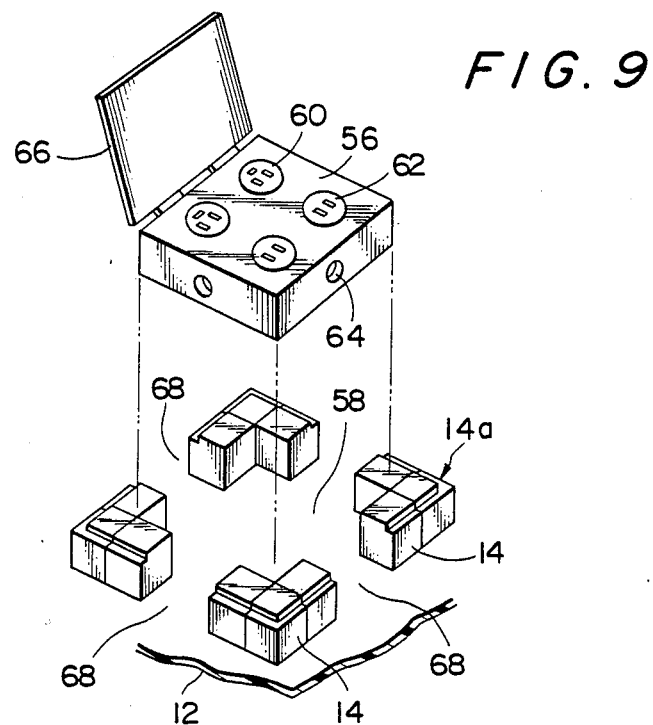
FIGS. 9 and 10 are exploded perspective views showing an example of the flooring panel of the present invention operatively connected to an electrical device.

As seen in FIG. 9, the blocks 14 secured to the sheet 12 may be dispensed with if need be. For example, the square cable laying fixture 56 may be accommodated in a square space 58 obtained by eliminating several blocks 14 in the vicinity of the center of a block, such as a block 14a. The fixture 56 may include for example an outlet 60 for a power line and an outlet 62 for a communication or signal line. Since a cable inlet opening 64 is formed on at least one side of the fixture 56, the block 14 facing to the inlet opening 64 of the side of the fixture 56, where the cable 50 is desired to be introduced, is removed, and the cable 50 is then introduced via a resulting conduit 68 and the inlet opening 64 into the fixture 56. Several blocks 14 confronting to the crossing point of the cable ducts 16a and 16b may also be removed and the fixture 56 placed in the resulting square space 58. Preferably, the fixture 56 has a removable door-type cover 66 in which the upper surface of the cover 66 is approximately flush with or projects from the upper surface of the blocks 14 on closing the cover 66.

Figure 10:
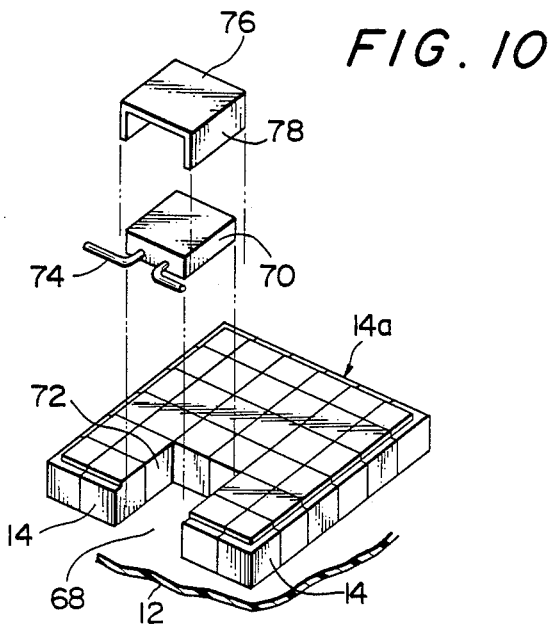

Referring to FIG. 10, a small-sized electrical device 70 such as an optical link or an A/D converter may be accommodated within an additional space 72 which is formed by removing a block 14 facing to, for example, the cable duct 16a. The leads 74 of the device 70 may be directed towards an opening 68 for connecting to the cable 50. When the element 70 is lower in height than the block 14, a cover member 76 may be placed on the element 70. The cover member 70 also has a channel shape or the shape of the inverted letter U, the legs 28 of which are set so as to be equal in height to the blocks 14. The cover member 76 is used not only for protecting the element 70, but for improving the strength of the blocks 14 defining the additional space 72.

The element 70 may be secured to those portions of the sheet 12 exposed at the bottom of the additional space 72 by fasteners such as screws or with the use of an adhesive or a double-sided adhesive tape. In such a manner, the cable laying fixture or electrical elements can be installed in any desired location such as an intermediate point of the cable 50 by removing the blocks 14 as the occasion may demand, so that the cable laying operation is facilitated. The space 58 or 72 obtained by removing the blocks 14 may be used not only as the mounting site for the fixture 56 or devices 70, but as the winding or storage area for superfluous cable length portions.

The surfaces of electric device 70 and cover 66 of fixture 56 may also be coated with a layer of electrostatically implanted fibers as in the case of cover plate 18, resulting in preventing top layer 48 from shifting horizontally, as well as softning walking shock.

FIG. 11 shows an embodiment wherein the cable laying space for the cables 50 is divided into an upper and lower spaces or layers 86 and 88. More specifically, each block 14 has generally the shape of a column, and a cable laying space of a prescribed width c or d is formed between the two adjacent columnar blocks 14. Each block 14 has a peripheral step 26b at a mid height and another peripheral step 26 in the vicinity of an upper terminal portion 42. In such a manner, the block 14 has three different diameters such that these diameters become lesser from the bottom towards the top of the block 14. The cover plate 18 has a number of circular openings 44 in register with the blocks 14, with each opening 44 being of such a diameter that the cover plate is supported by the steps 26 of the upper terminal portions 42 of the blocks 14, so that the cover plate 18 is supported by the steps 26 at the height of these steps 26 when the openings 44 of the plate 18 are engaged by the upper terminal portions 42.

According to the present embodiment, a number of partitioning plates 84 having corner recesses or notches 82 in the form of quadrants in register with the blocks 14 may be placed so as to be supported at the corners on the central steps 26, the notches 82 being of such a diameter that the plates 84 can be supported in this manner by the central steps 26. The upper and lower spaces 86 and 88 may be defined in this manner for accommodating the cables 50. The partitioning plate 84 may be of the same material as the cover plate 18, as an example. The partitioning plates 84 may also be advantageously formed with cable pull-out openings and/or slits for improving its flexibility as in the case of the cover plate 18. The columnar blocks 14 may also be provided with an additional step or steps for providing three or more separate spaces for accommodating the cables or wiring.

In the present embodiment, the partitioning plate 84 has the size approximately equal to the rectangle defined by the four columnar blocks 14. As an alternative, the partitioning plate may be in the form of a flat plate of approximately the same size as the flooring panel 10 and having circular apertures corresponding to the recesses 82 in register with the columnar blocks 14. The partitioning plates 84 may be provided only in areas with a higher cable density. The partitioning plates 84 may also be used for providing a site for storing electrical devices or winding of superfluous cable length portions.

Figure 15:
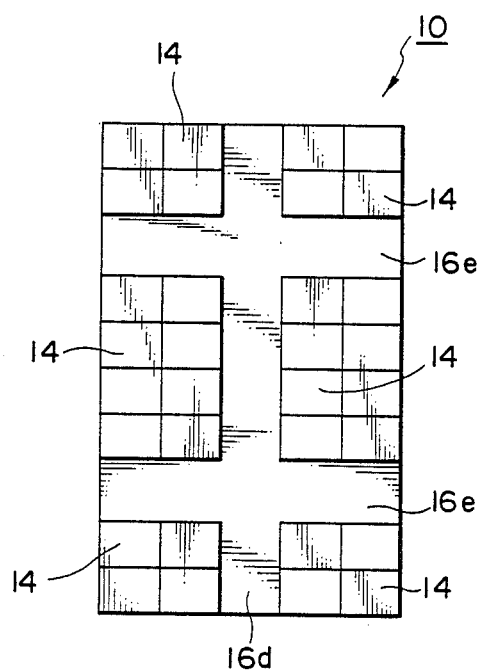
FIG. 15 is a schematic plan view showing the flooring panel according to another alternative embodiment of the present invention.

The cable laying ducts 16a to 16c may be arranged in other than the cruciform or latticed shapes. For example, a number of longitudinal rows of the cable ducts and another number of transverse rows of the cable ducts different from the number of the longitudinal rows may be arranged in one flooring panel 10 orthogonally to each other, for example, two transverse rows may be provided for one longitudinal row as shown in FIG. 15. Or alternatively, the flooring panel 10 may be formed with obliquely extending cable laying ducts as in the form of letters X or Y.

From the foregoing it will be appreciated that the cable ducts having any desired cable housing capacities may be easily formed with the desired layout by laying the modular floor panels on the permanent building floor. The cables may be introduced in place within the cable ducts through the open top thereof so that the laying and branching operation may be performed easily. The cover plate may be removably attached from above so that any changes or addition of the cable laying accompanying the extension or reallocation of devices after the initial cable laying or inspection of the cable laying state can be implemented easily.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A flooring panel to be laid on a generally flat floor of a building for placing a cable therein, comprising:
   a plurality of solid blocks;
   holding means including a sheet of flexible material for holding said blocks, said blocks defining a plurality of sections, each of said sections cotnaining at least one block with a cable laying space defined between adjacent ones of the sections and a primary surface of the sheet; and
   a covering member supported by at least a portion of said blocks for covering at least an upper opening of the cable laying space, said covering member presenting a surface that is continuous with upper surfaces of said blocks to form a substantially flat, top surface of said flooring panel.

2. The flooring panel in accordance with claim 1, wherein,
   said covering member is formed of a flat plate of a rigid material;
   said flat plate having a slit formed therein to allow the flat plate to be bent.

3. The flooring panel in accordance with claim 1, wherein said covering member has an opening formed therein through which a cable can be pulled out from the cable laying space.

4. The flooring panel in accordance with claim 1, wherein said cable laying space includes at least one cable laying duct extending in a first direction, and at least one cable laying duct extending in a second direction intersecting the first direction;
   said covering member being of a flat configuration covering at least an upper opening of the cable laying ducts.

5. The flooring panel in accordance with claim 1, wherein,
   each of said sections includes a plurality of blocks;
   a gap being defined between adjacent ones of said blocks.

6. The flooring panel in accordance with claim 1, wherein a layer of shock absorbing material is formed on at least one primary surface of said covering member, said shock absorbing material absorbing mechanical shocks.

7. A flooring panel in accordance with claim 6, wherein said layer of shock absorbing material includes a layer of electro-statically implanted fibers.

8. The flooring panel in accordance with claim 6, wherein said layer of shock absorbing material is made of a material selected from a group consisting of synthetic resin and rubber.

9. A flooring panel to be laid on a floor of a building for placing a cable therein, comprising:
   a plurality of blocks of solid material;
   holding means including a flexible material for hodling said blocks, said blocks defining a plurality of sections, each of said sections containing at least one block with a cable laying spaced defined between adjacent ones of the sections, said cable laying space being defined in plan in a generally symmetrical cruciform shape;
   a covering member supported by at least a portion of said blocks for covering at least an upper opening of the cable laying space, said covering member presenting a surface that is continuous with upper surfaces of said blocks to form a substantially flat, top surface of said flooring panel, said covering member having a generally symmetrical cruciform shape in plan substantially corresponding to the cable laying space; and
   an opening defined in said covering member, said opening permitting a cable to be pulled therethrough from said cable laying space, said opening being formed in one arm of the cruciform shape of said covering member.

10. A flooring panel to be laid on a floor of a building for placing a cable therein, comprising;
    a plurality of of blocks of solid material;
    holding means including a flexible material for holding said blocks, said blocks defining a plurality of sections, each of said sections containing at least one block with a cable laying space defining between adjacent ones of the sections;
    a covering member supported by at least a portion of said blocks for covering at least an upper opening of the cable laying space, said covering member presenting a surface that is continuous with upper surfaces of said blocks to form a substantially flat, top surface of said flooring panel;
    an opening defined in said covering member, said opening permitting a cable to be pulled therethrough from said cable laying space; and
    a holding member engageable with a cable pulling out device attached to said opening, said holding member holding the calbe pulling out device to said covering member.

11. A flooring panel to be laid on a floor of a building for placing a cable therein, comprising:
    a plurality of blocks of solid material;
    holding means including a flexible material for holding said blocks, said blocks defining a plurality of sections, each of said sections containing at least one block with a cable laying space defined between adjacent ones of the sections, said holding means comprising a flexible flat plate member, said blocks being held on one primary surface of said plate member; and
    a covering member supported by at least a portion of said blocks for covering at least an upper opening of the cable laying space, said covering member presenting a surface that is continuous with upper surfaces of said blocks to form a substantially flat, top surface of said flooring panel.

12. A flooring panel to be laid on a floor of a building for placing a cable therein, comprising:
    a plurality of blocks of solid material;
    holding means including a flexible material for holding said blocks, said blocks defining a plurality of sections, each of said sections containing at least one block with a cable laying space defining between adjacent ones of the sections, said holding means further comprises a layer of flexible material covering and holding said blocks from above; and a covering member supported by at least a portion of said blocks for covering at least an upper opening of the cable laying space, said covering member presenting a surface that is continuous with upper surfaces of said blocks to form a substantially flat, top surface of said flooring panel.

13. A flooring panel to be laid on a floor of a building for placing a cable therein, comprising:

a plurality of blocks of solid material;

holding means icnlduing a flexible material for holding said blocks, said blocks defining a plurality of sections, each of said sections containing at least one block with a cable laying space defined between adjacent ones of the sections, said holding means further comprising;

a flexible flat plate member for holding said blocks on one primary surface of said plate member, and a layer of flexible material for covering and holding said blocks from above; and a covering member supported by at least a portion of said blocks for covering at least an upper opening of the cable laying space, said covering member presenting a surface that is continuous with upper surfaces of said blocks to form a substantially flat, top surface of said flooring panel.

14. A flooring panel to be laid on a floor of a building for placing a cable therein, comprising:

a plurality of blocks of solid material;

holding means including a flexible material for holding said blocks, said blocks defining a plurality of sections, each of said sections containing a plurality of blocks with a cable laying space defined between adjacent ones of the sections, said blocks being removably held by said holding means whereby an additional space communicating with the cable laying space is formed by selectively removing said blocks; and a covering member supported by at least a portion of said blocks for covering at least an upper opening of the cable laying space, said covering member presenting a surface that is continuous with upper surfaces of said blocks to form a substantially flat, top surface of said flooring panel.

15. The flooring panel in accordance with claim 14, further comprising an additional covering member overlying an upper opening of the additional space.

16. A flooring panel to be laid on a floor of a building for placing a cable therein, comprising:

a plurality of blocks of solid material;

holding means including a flexible material for holding said blocks, said blocks defining a plurality of sections, each of said sections containing at least one block with a cable laying space defined between adjacent ones of the sections, said sections defining said cable laying spaces intersecting one another;

a covering member supported by at least a portion of said blocks for covering at least an upper opening of the cable laying space, said covering member presenting a surface that is continuous with upper surfaces of said blocks to form a substantially flat, top surface of said flooring panel; and a spacer member that can be arranged at an intersection of the spaces for spacing cables mutually intesecting at the intersection from one another.

17. A flooring panel to be laid on a floor of a building for placing a cable therein, comprising:

a plurality of blocks of solid material;

holding means including a flexible material for holding said blocks, said blocks defining a plurality of sections, each of said sections containing at least one block with a cable laying space defined between adjacent ones of the sections;

a covering member supported by at least a portion of said blocks for covering at least an upper opening of the cable laying space, said covering member presenting a surface that is continuous with upper surfaces of said blocks to form a substantially flat, top surface of said flooring panel;

a flat plate having a cut-out portion for receiving said blocks; and means for supporting said flat plate with the cut-out portion at at least one position intermediate in height of said blocks whereby the cable laying space is divided into a plurality of layers by said flat plate.

18. The flooring panel in accordance with claim 17, wherein said flat plate is substantially equal in size to said covering member, said cut-out portion being formed in the form of apertures corresponding to said blocks.

19. The flooring panel in accordance with claim 17, wherein each of said plurality of blocks includes a column defining one of the sections, said columns being held in an array by said holding means;

said flat plate being of substantially the same size as the rectangle formed by mutually adjacent four of said blocks arranged in the array, said cut-out portions being in the form of notches each partially receiving an associated one of said four blocks.

20. A flooring panel system wherein a plurality of modular flooring panels of at least one type are laid on a floor of a building, each of said modular flooring panels comprising:

a plurality of blocks of solid material;

holding means including a flexible material generally rectangular in plan configuration for holding said blocks so that said blocks define a plurality of sections, each of said sections including at least one block with a space for laying a cable defined between adjoining ones of said sections; and a cover member supported by at least a portion of said blocks for covering at least an upper opening of the space, said cover member presenting a surface cortinuous with upper surfaces of said blocks to form a substantially flat, top surface of said modular flooring panel;

whereby the cable laying spaces are defined in communication with one another when said modular flooring panels are laid on the building floor.

21. A flooring panel wherein a plurality of modular flooring panels of plural types are laid on a floor of a building, each of said modular flooring panels comprising:

a plurality of blocks of solid material;

holding means including a flexible material generally rectangular in plan configuration for holding said blocks so that said blocks define a plurality of sections, each of said sections including at least one block with a space for laying a cable defined between adjacent ones of said sections, said spaces being different among the plural types of said modular flooring panels in at least one of shape, size, number and position; and a cover member supported by at least a portion of said blocks for covering at least an upper opening of the space, said cover member presenting a surface continuous with upper surfaces of said blocks to form a substantially flat, top surface of said modular flooring panel;

whereby the cable laying spaces are defined in communication with one another when said modular flooring panels of the different types are selectively laid on the building floor under a cable laying condition including the number of cables.

* * * * *